J. F. TRITLE.
ELECTRIC BRAKING.
APPLICATION FILED MAY 2, 1910.

973,590.

Patented Oct. 25, 1910.
2 SHEETS—SHEET 1.

Witnesses:
Earl G. Klock.
J. Ellis Ela

Inventor:
John F. Tritle,
by
His Attorney.

J. F. TRITLE.
ELECTRIC BRAKING.
APPLICATION FILED MAY 2, 1910.

973,590.

Patented Oct. 25, 1910.
2 SHEETS—SHEET 2.

Witnesses:
Earl G. Klock.
J. Ellis Elm.

Inventor:
John F. Tritle,
by Albert G. Davis
His Attorney.

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

ELECTRIC BRAKING.

973,590.  Specification of Letters Patent.  Patented Oct. 25, 1910.

Application filed May 2, 1910. Serial No. 558,925.

*To all whom it may concern:*

Be it known that I, JOHN F. TRITLE, a citizen of the United States, residing at Schenectady, county of Schenectady, State of New York, have invented certain new and useful Improvements in Electric Braking, of which the following is a specification.

My invention relates to the control of electric motors to cause them to act as braking generators for returning current to the line or to the source, and its object is to provide means for compensating, to some extent, for variation in the motor speed, so as to maintain an effective braking action as the motor speed falls. I accomplish this result by providing means for separately exciting the motor fields and automatically compounding the excitation to compensate for varying motor speed. More specifically, I provide a separate exciter with a second exciter varying in speed with the motor and exerting a differential action on the field of the first exciter.

My invention will best be understood by reference to the accompanying drawing in which—

Figure 1:
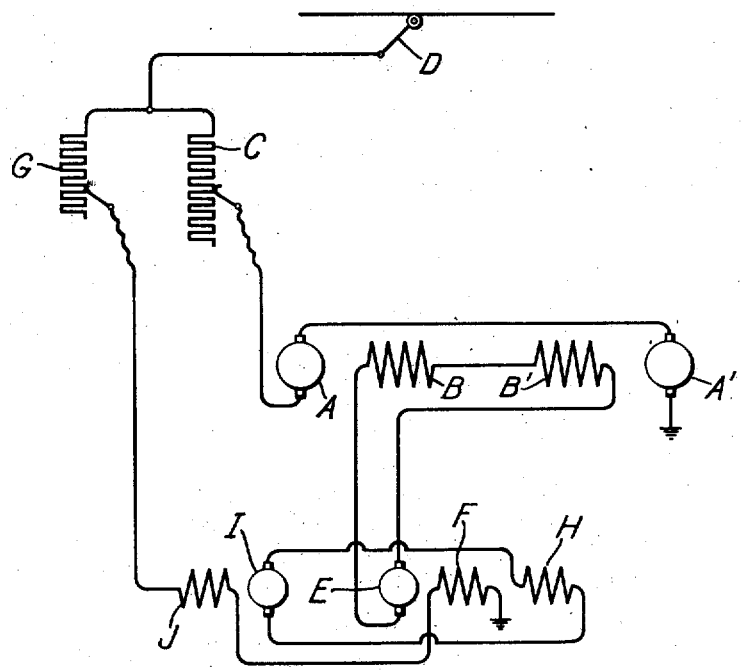
Figure 2:
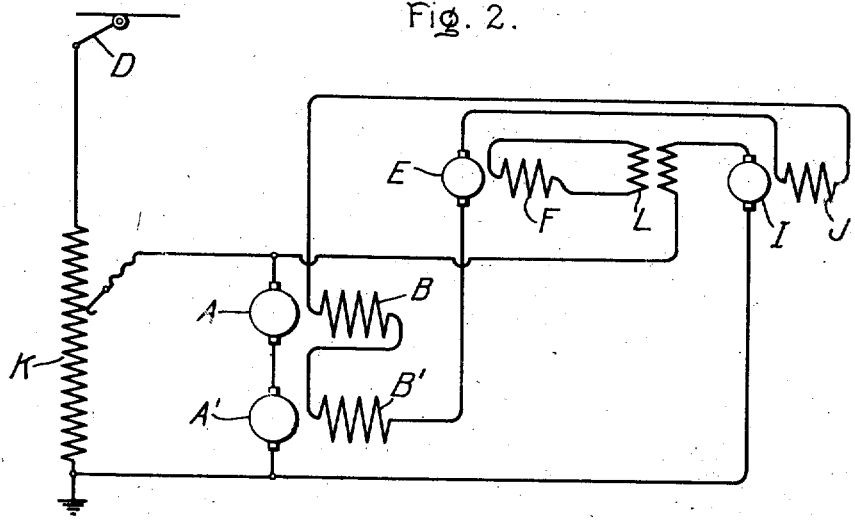
Figure 3:
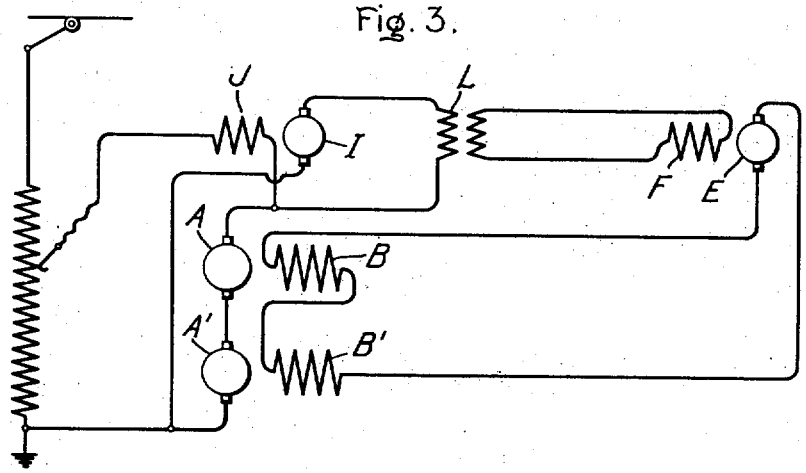

Figure 1 shows diagrammatically a pair of direct current motors provided with controlling means arranged in accordance with my invention; and Figs. 2 and 3 show diagrammatically my invention applied to the control of alternating current motors.

In Fig. 1, A $A^1$ represent the armatures of a pair of direct current motors and B $B^1$ their fields. The motor armatures are shown connected through the resistance C to a source of current or to a trolley wire through the trolley D. E represents the armature of the exciter for these motors. This exciter may be driven at constant speed or from the motor axles. It has a main field F excited from the source through a resistance G and a differential field H excited from the armature I of a second exciter which is driven from the car axle so as to vary in speed with the motors A $A^1$. The field of this second exciter, indicated at J, is excited from the source and may be connected in series with the main field F of the exciter E.

With the motors connected as shown and acting as braking generators it will be seen that as the motor speed falls the braking action will tend to diminish because of decreased induced voltage in the motor armatures, but a decrease in speed in the motors means a decrease in speed in the exciter armature I, the voltage of which correspondingly decreases. This weakens the differential effect in the field winding H and increases the voltage per revolution of the exciter E. This exciter, therefore, furnishes more current to the field windings B $B^1$ and thereby compensates to a greater or less extent for the drop in voltage of the motors. Thus the excitation of the motors is automatically compounded by the varying differential effect of the exciter I on the field of the exciter E. Adjustment for different speeds and braking effects may be obtained by adjusting the amount of resistance C or of resistance G as is indicated diagrammatically in the drawing.

If the exciter armature E is driven at constant speed, its voltage obviously will rise as the speed of the motor armatures A $A^1$ and therefore of armature I falls, so that by proper adjustment of windings F and H the voltage of armatures A $A^1$ may be held practically constant over a wide range of speed. If the armature E is driven from the axle, the voltage of armatures A $A^1$ cannot be held so nearly constant, but since the field that induces the voltage in the armature E is the difference of two quantities, one constant and one varying with the speed, it is possible by making those two quantities large, relatively to their difference, to produce a much greater percentage variation in their difference than in the quantity which varies. In other words, the resultant of fields F and H may increase considerably faster than the speed of armature E decreases, over a certain range, so that over that range the strengths of fields B and $B^1$ may be increased as the speed of armatures A $A^1$ falls so as to maintain the armature voltage of the motors and consequently their braking effect.

The arrangement shown in Fig. 1 cannot be applied precisely in that form to alternating current motors since the phase relations of the several circuits would not be correct. For instance while the voltage impressed upon the field winding F would be in phase with the voltage of the source, the voltage impressed upon the field winding H would be in phase with the voltage of armature I which is in phase with the current in field winding J and consequently approximately in quadrature with the voltage of the source. Thus the magnetizing effects of the two windings F and H would be in quadrature and not in opposition. The same principle, however, is applicable to alternating current motors and may be embodied in several different arrangements. One such arrangement is shown in Fig. 2. In this figure the motor armatures A and $A^1$ are shown connected to the transformer winding K which in this case acts as a source of current for the motors. The field windings B and $B^1$ are excited from the armature E of an exciter which in this case has only a single field winding F supplied from the secondary of the transformer L. The primary of this winding is connected to the source but has in series with it the armature I of the second exciter, the field winding J of this exciter being so connected as to cause the voltage of the armature I to oppose the voltage of the source in the circuit of the primary of transformer L.

The principle of operation is the same as has been described for Fig. 1. As the speed decreases, the voltage of armature I decreases, thereby weakening its differential effect and causing the resulting voltage of the primary of transformer L to rise. This increases the field excitation in winding F and therefore the voltage per revolution of exciter armature E. The field J in this case is shown connected in series with the motor fields B and $B^1$ and therefore excited from the exciter E. The connections shown in this figure give proper phase relations in the several circuits. It will be understood that while for the sake of simplifying the diagram I have shown no compensating windings for the motors, such windings would in practice be employed as is customary in alternating current series motors.

In Fig. 3 the same arrangement is shown as in Fig. 2 except that the field J of the second exciter is placed in series with the motor armatures instead of the motor fields. In this case not only does the drop in speed of the exciter I reduce its voltage but also if the current returned by the motors to the line is reduced, the strength of field winding J is decreased thereby and the voltage of armature I further weakened.

Further modifications of my invention both for direct and alternating current motors will be obvious to those skilled in the art. Accordingly I do not desire to limit myself to the particular connections and arrangement of parts shown and described but aim in the appended claims to cover all modifications which are within the scope of my invention.

What I claim as new and desire to secure by Letters Patent of the United States, is,—

1. In combination with an electric motor and a source of current therefor, means for causing the motor to act as a braking generator for returning energy to the source, consisting of means for separately exciting the field winding of the motor, and means for automatically compounding the excitation to compensate for varying speeds.

2. In combination with an electric motor and a source of current therefor, means for causing the motor to act as a braking generator for returning energy to the source, said means consisting of a separate exciter for exciting the field winding of the motor, and means for automatically varying the voltage per revolution of the exciter to compensate for variation in the motor speed.

3. In combination with an electric motor and a source of current therefor, means for causing the motor to act as a braking generator to return energy to the source comprising an exciter for separately exciting the motor field and a second exciter varying in speed with the motor and having its armature connected to exert a differential effect upon the field of the first mentioned exciter so as to increase the voltage per revolution of the first mentioned exciter as the motor speed decreases.

4. In combination with an electric motor and a source of current therefor, means for causing the motor to act as a braking generator to return energy to the line, consisting of an exciter for separately exciting the motor field and a second exciter varying in speed with the motor, the field of the first mentioned exciter being excited differentially by voltage derived from the source and from the armature of the second exciter.

5. In combination with an alternating current motor of the commutator type and a source of current therefor, means for causing the motor to act as a braking generator for returning energy to the source, consisting of an exciter having its armature connected to the field winding of the motor and a transformer having its primary connected to the source and its secondary to the field winding of said exciter, and a second exciter having its armature connected in series with the primary of said transformer and its field winding connected to produce an armature voltage opposing the voltage of the source in the circuit of said transformer primary.

6. In combination with an electric motor and a source of current therefor, means for causing the motor to act as a braking generator for returning energy to the source, consisting of an exciter for separately exciting the motor field and a second exciter varying in speed with the motor and having its armature connected to produce a differential effect proportional to its voltage on the field of the motor so as to compensate for varying motor speed.

In witness whereof, I have hereunto set my hand this 30th day of April, 1910.

JOHN F. TRITLE.

Witnesses:
BENJAMIN B. HULL,
HELEN ORFORD.